United States Patent
Mazzo

(10) Patent No.: US 8,381,772 B2
(45) Date of Patent: *Feb. 26, 2013

(54) LOW-PRESSURE HOSE FOR CONNECTION TO DIVING CYLINDERS FOR UNDERWATER ACTIVITIES

(76) Inventor: Mauro Mazzo, Casatenovo (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/712,510

(22) Filed: Mar. 1, 2007

(65) Prior Publication Data

US 2007/0209728 A1  Sep. 13, 2007

(30) Foreign Application Priority Data

Mar. 10, 2006  (IT) .............................. MI2006A0427

(51) Int. Cl.
*F16L 11/00* (2006.01)
(52) U.S. Cl. ...... 138/109; 138/125; 138/130; 428/36.91
(58) Field of Classification Search .................. 138/109, 138/130, 125; 428/36.91
See application file for complete search history.

(56) References Cited

U.S. PATENT DOCUMENTS

| | | | | |
|---|---|---|---|---|
| 1,972,756 A | * | 9/1934 | Blaisdell ........................ | 28/169 |
| 2,833,313 A | * | 5/1958 | Penman ........................ | 138/125 |
| 3,604,461 A | * | 9/1971 | Matthews ..................... | 138/137 |
| 3,866,631 A | * | 2/1975 | Chudgar ........................ | 138/125 |
| 4,130,139 A | * | 12/1978 | Haren ........................... | 138/125 |
| 4,345,624 A | * | 8/1982 | Rider ............................. | 138/110 |
| 4,380,252 A | * | 4/1983 | Gray et al. .................... | 138/125 |
| 4,420,018 A | * | 12/1983 | Brown, Jr. .................... | 138/124 |
| 4,522,235 A | * | 6/1985 | Kluss et al. ................... | 138/130 |
| 5,349,988 A | * | 9/1994 | Walsh et al. .................. | 138/109 |
| 5,430,603 A | * | 7/1995 | Albino et al. ................. | 361/215 |
| 5,526,848 A | * | 6/1996 | Terashima et al. ........... | 138/125 |
| 5,655,572 A | * | 8/1997 | Marena ......................... | 138/125 |
| 5,931,200 A | * | 8/1999 | Mulvey et al. ................ | 138/109 |
| 6,257,280 B1 | * | 7/2001 | Marena ......................... | 138/125 |
| 6,390,141 B1 | * | 5/2002 | Fisher et al. .................. | 138/137 |
| 6,742,545 B2 | * | 6/2004 | Fisher et al. .................. | 138/137 |
| 6,807,988 B2 | * | 10/2004 | Powell et al. ................. | 138/125 |
| 7,367,364 B2 | * | 5/2008 | Rivest et al. .................. | 138/121 |
| 2002/0112770 A1 | * | 8/2002 | Fisher et al. .................. | 138/137 |
| 2005/0183785 A1 | * | 8/2005 | Lundberg et al. ............ | 138/130 |
| 2005/0199308 A1 | * | 9/2005 | Swails et al. ................. | 138/109 |
| 2006/0151043 A1 | * | 7/2006 | Nanney et al. ................ | 138/125 |
| 2009/0211660 A1 | * | 8/2009 | Johnson et al. ............... | 138/126 |

* cited by examiner

*Primary Examiner* — James Hook
(74) *Attorney, Agent, or Firm* — Allen, Dyer, Doppelt, Milbrath & Gilchrist, P.A.

(57) ABSTRACT

A low-pressure hose for connection to diving cylinders for underwater activities, comprising an inner tubular element, which is sheathed by an inner sheathing layer constituted by a polyester braid, the hose further comprising an outer sheathing layer constituted by nylon braiding.

9 Claims, 1 Drawing Sheet

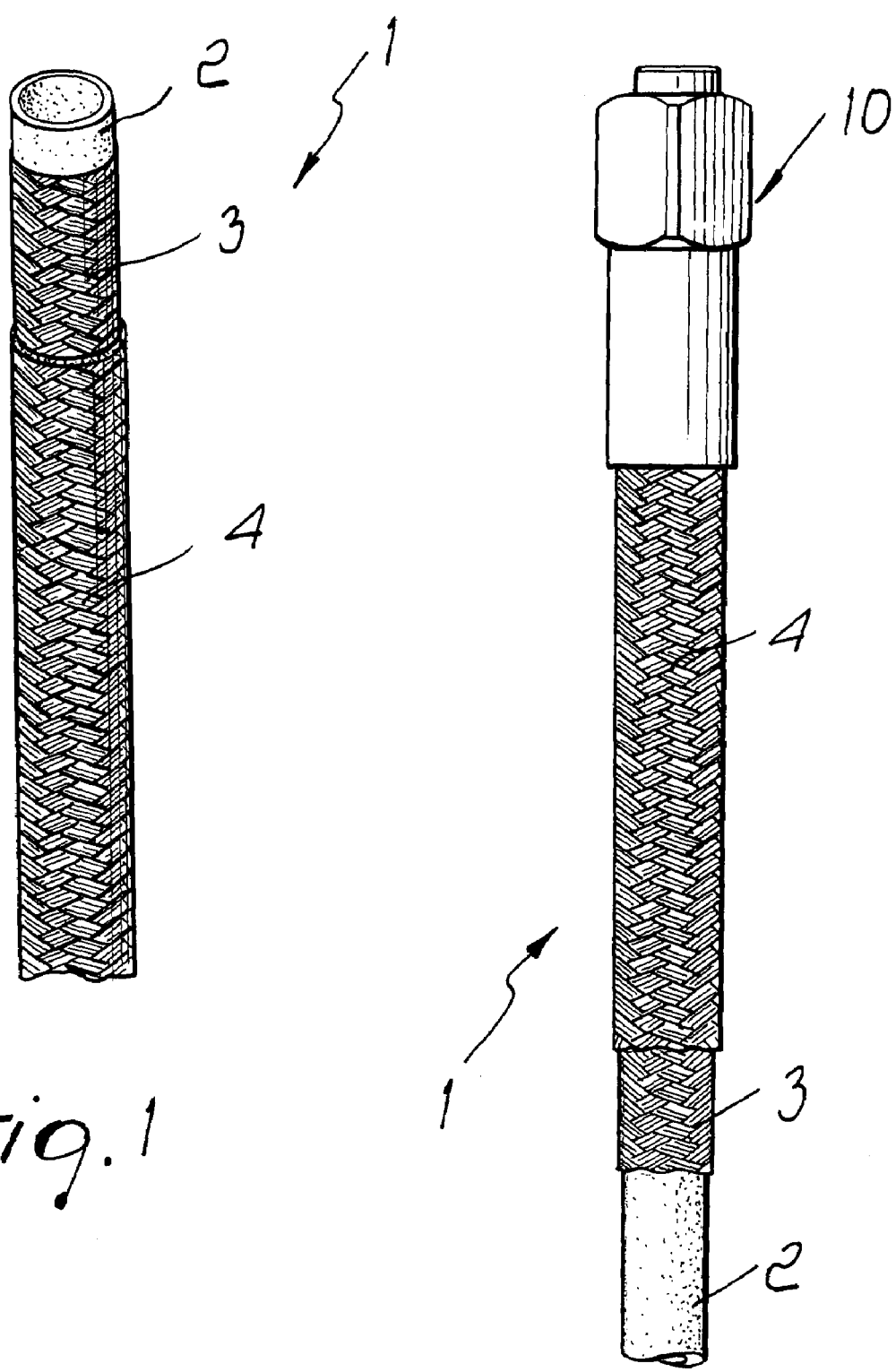

LOW-PRESSURE HOSE FOR CONNECTION TO DIVING CYLINDERS FOR UNDERWATER ACTIVITIES

The present invention relates to a low-pressure hose for connection to diving cylinders for underwater activities.

BACKGROUND OF THE INVENTION

As is known, low-pressure hoses used for connection to diving cylinders for underwater activities are provided by means of an inner tubular element, which is sheathed by a polyester braid, over which there is an outer tubular element, generally made of polyvinyl chloride or polyurethane and designed in practice to create a protective element for the polyester braid, which is mostly entrusted with the function of withstanding the bursting pressure of the hose.

This type of hose, though being used widely for applications in the underwater field, suffers the drawback that, when the hose is bent, the outer sheath, constituted by the PVC or polyurethane hose, tends to separate from the braid, thus forming discontinuities which are particularly damaging, especially when using underwater jackets, in which the hoses are subjected to very tight bending.

The bending of the outer tubular element displaces the filaments of the braid, reducing the strength characteristics of the hose, and infiltrations between the hoses can also occur.

It should be added to the above that the presence of two distinct tubular elements, one superimposed on the other, inevitably leads to an increase in the stiffness of the hose, making it less flexible, and this is particularly disadvantageous, especially when used with underwater jackets in which the hoses are bent considerably.

SUMMARY OF THE INVENTION

The aim of the invention is to eliminate the drawbacks noted above by providing a low-pressure hose for connection to diving cylinders for underwater activities which allows to increase considerably the bursting strength and tensile strength while introducing greater flexibility for the hose.

Within this aim, an object of the invention is to provide a low-pressure hose in which any bending to which it is subjected does not separate the layers that compose it and in which the bends further cannot cause obstruction of the hose with consequent blocking of the flow of air.

Another object of the present invention is to provide a low-pressure hose which, even if tied in a knot, does not cause interruptions in the flow and further always has the tendency to return to the initial position even if traction is applied to a hose forming a noose.

Still another object of the present invention is to provide a low-pressure hose which is lighter, more resistant to abrasion and not affected by aging due to exposure to sunlight.

This aim and these and other objects which will become better apparent hereinafter are achieved by a low-pressure hose for connection to diving cylinders for underwater activities, comprising an inner tubular element, which is sheathed by an inner sheathing layer constituted by a polyester braid, characterized in that it comprises an outer sheathing layer constituted by nylon braiding.

BRIEF DESCRIPTION OF THE DRAWINGS

Further characteristics and advantages of the invention will become better apparent from the description of a preferred but not exclusive embodiment of a low-pressure hose for connection to diving cylinders for underwater activities, illustrated by way of nonlimiting example in the accompanying drawings, wherein:

FIG. 1 is a schematic layered view of the hose;
FIG. 2 is a view of the end of a hose connected to a coupling connector.

DESCRIPTION OF THE PREFERRED EMBODIMENTS

With reference to the figures, the low-pressure hose for connection to diving cylinders for underwater activities, according to the invention, generally designated by the reference numeral 1, comprises an inner tubular element 2, which is advantageously made of plastic material, preferably of the polyethylene or polyurethane type.

An inner sheathing layer 3 is provided on the inner tubular element 2 by means of a polyester braid which is formed directly over the hose.

The peculiar feature of the hose according to the invention resides in that there is an outer sheathing layer 4, which is provided by means of a nylon braiding which performs a number of functions, the most important of which is the provision of an abrasion-resistant element, which however cooperates to increase the mechanical strength on the hose, consequently improving both the bursting pressure and the traction values.

It should be noted that the outer sheathing layer 4, constituted by the nylon braiding, is provided directly on the tubular element, differently from a solution of the background art which applies, in practice like a sheath, an outer sheathing braid to the hose, but in such a way that it constitutes an independent element which does not cooperate intimately with the hose except for providing an outer sheathing element.

In the invention, a sheathing layer is provided which is constituted by braiding obtained directly on the hose and fixed to the hose by means of rings or bushes made of stainless steel or brass, for application to a wide variety of coupling elements, generally designated by the reference numeral 10 in the drawing; the coupling is applied directly over the sheathing layer, which is thus intimately connected to the connecting element for use of the hose.

The presence of the outer nylon braiding allows to have great strength together with very high flexibility, which prevents choking of the hose even if it is bent.

The nylon braiding, which constitutes the outer sheathing 4, besides ensuring optimum resistance to abrasion, also helps to reduce any leaks in emergency conditions, thanks to the natural tendency to close holes which characterizes braiding when pressure is applied thereto.

Moreover, another advantage resides in that the braiding provides protection against UV rays, delaying aging and thus ensuring additional safety.

From what has been described above, it can be seen therefore that the invention achieves the intended aim and objects and attention is called to the particular constructive solution in which there is, on the outside of a hose to be used for underwater activities, a braided nylon element which is an integral part of the hose and increases considerably both bursting resistance and tensile strength, since in experimental tests it has been observed that bursting resistance exceeds 250 bars and tensile strength is over 200 kg.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application no. MI2006A000427 from which this application claims priority, are incorporated herein by reference.

What is claimed is:

1. A low-pressure hose for connection to a diving cylinder for use in underwater activities, the low pressure hose comprising:
    an inner tubular element;
    an inner sheathing layer directly on the inner tubular member and comprising a polyester braid;
    an outer sheathing layer directly on the inner sheathing layer and comprising a nylon braid to define an abrasion-resistant outermost element of the low pressure hose that is independent from, not attached to, and does not cooperate intimately with the inner tubular element and inner sheathing layer and thereby provides enhanced flexibility and kinking prevention; and
    a hose coupling extending directly over the outer sheathing layer at an end of the hose for connecting to the diving cylinder.

2. The low-pressure hose according to claim 1, wherein said inner tubular element comprises polyethylene.

3. The low-pressure hose according to claim 1, wherein said inner tubular element comprises polyurethane.

4. The low-pressure hose according to claim 1, wherein said outer sheathing layer further defines a UV protection element.

5. The low-pressure hose according to claim 1, wherein said hose coupling element comprises at least one of stainless steel and brass.

6. The low-pressure hose according to claim 1, wherein said outer sheathing layer is configured to increase bursting resistance and tensile strength of the hose.

7. The low-pressure hose according to claim 6, wherein the bursting resistance is at least 250 Bars.

8. The low-pressure hose according to claim 6, wherein the tensile strength is at least 200 Kg.

9. The low-pressure hose according to claim 1, wherein the nylon braid of the outer sheathing layer is configured to prevent kinking of the low-pressure hose when bent during underwater diving activities.

* * * * *

(12) EX PARTE REEXAMINATION CERTIFICATE (10856th)
United States Patent
Mazzo

(10) Number: US 8,381,772 C1
(45) Certificate Issued: *Apr. 26, 2016

(54) LOW-PRESSURE HOSE FOR CONNECTION TO DIVING CYLINDERS FOR UNDERWATER ACTIVITIES

(76) Inventor: Mauro Mazzo, Casatenovo (IT)

Reexamination Request:
No. 90/012,947, Sep. 10, 2013

Reexamination Certificate for:
| | |
|---|---|
| Patent No.: | 8,381,772 |
| Issued: | Feb. 26, 2013 |
| Appl. No.: | 11/712,510 |
| Filed: | Mar. 1, 2007 |

( * ) Notice: This patent is subject to a terminal disclaimer.

(30) Foreign Application Priority Data

Mar. 10, 2006 (IT) ............................... MI2006A0427

(51) Int. Cl.
*F16L 11/00* (2006.01)
*F16L 11/08* (2006.01)

(52) U.S. Cl.
CPC ..................................... *F16L 11/085* (2013.01)

(58) Field of Classification Search
CPC ......... F16L 11/00; F16L 11/08; F16L 11/085; F16L 11/086
USPC .......................... 138/109, 123, 124, 125, 130
See application file for complete search history.

(56) References Cited

To view the complete listing of prior art documents cited during the proceeding for Reexamination Control Number 90/012,947, please refer to the USPTO's public Patent Application Information Retrieval (PAIR) system under the Display References tab.

*Primary Examiner* — Russell Stormer

(57) ABSTRACT

A low-pressure hose for connection to [diving] cylinders for underwater activities[, comprising] *includes* an inner tubular element[, which is sheathed] *covered* by an inner [sheathing] *covering* layer [constituted] *formed* by a polyester braid[, the hose further comprising] and an outer [sheathing] *covering* layer [constituted] *formed* by *a* nylon [braiding] *braid*.

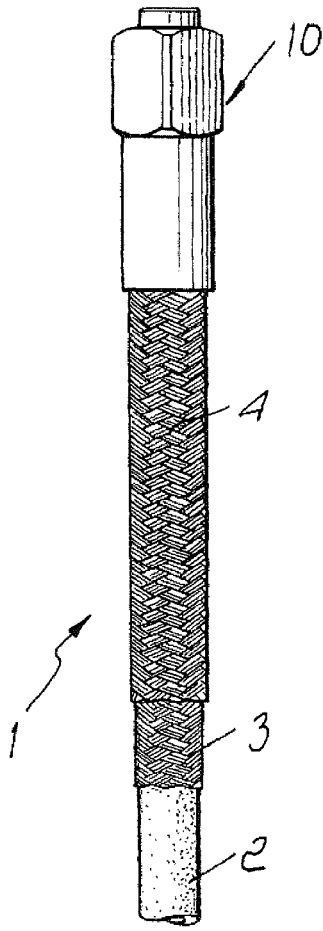

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 1, lines 5-6:

The present invention relates to a low-pressure hose for connection to [diving] cylinders for underwater activities.

Column 1, lines 10-17:

As is known, low-pressure hoses *which are* used for connection to [diving] cylinders for underwater activities are [provided by means of] *made from* an inner tubular element[,] which is [sheathed by] *covered with* a polyester braid, over which [there is] an outer tubular element[,] *is provided, this outer element* generally *being* made of polyvinyl chloride or polyurethane [and designed], *having,* in practice [to create], *the function of creating* a protective element for the polyester braid[,] which is [mostly entrusted with the] *required to have the principal* function of withstanding the bursting pressure of the hose.

Column 1, lines 18-24:

This type of hose, [though being used] *although* widely *used* for applications in the underwater field, [suffers] *has* the drawback that, when the hose is bent, the outer sheath, [constituted] *formed* by the PVC or polyurethane hose, tends to separate from the braid, thus [forming] *creating* discontinuities which are particularly damaging, especially when using [underwater] *diving* jackets, in which the hoses are subjected to very tight bending.

Column 1, lines 25-27:

The bending of the outer tubular element [displaces] *causes the displacement of* the filaments of the braid, *thereby* reducing the strength characteristics of the hose, and infiltrations between the hoses can also occur.

Column 1, lines 28-33:

It should be added to the above that the presence of two distinct tubular elements, one superimposed on the other, inevitably leads to an increase in the stiffness of the hose, making it less flexible, and this is particularly disadvantageous, especially [when used with underwater jackets] *in the case of use with diving jackets,* in which the hoses are bent considerably.

Column 1, lines 37-41:

The aim of the invention is to eliminate the drawbacks noted above by providing a low-pressure hose for connection to diving cylinders for underwater activities which [allows to increase] *makes it possible to* considerably *increase* the bursting strength and tensile strength[,] while [introducing] *providing* greater flexibility for the hose.

Column 1, lines 42-46:

Within [this] *the scope of the aforesaid* aim, [an] *a particular* object of the invention is to provide a low-pressure hose in which any bending to which it is subjected does not [separate the layers that compose it] *cause the detachment of its constituent layers,* and in which, *furthermore,* the bends [further] cannot cause obstruction of the hose with consequent blocking of the flow of air.

Column 1, lines 47-51:

Another object of the present invention is to provide a low-pressure hose which, even if tied in a knot, does not cause interruptions in the flow and [further], *furthermore,* always has the tendency to return to the initial position even if traction is applied to a hose forming a noose.

Column 1, lines 55-61:

This aim and these and other objects which will become better apparent hereinafter are achieved by a low-pressure hose for connection to [diving] cylinders for underwater activities, comprising an inner tubular element[, which is sheathed] *covered* by an inner [sheathing] *covering* layer [constituted] *formed* by a polyester braid, characterized in that it comprises an outer [sheathing] *covering* layer [constituted] *formed by a* nylon [braiding] *braid*.

Column 1, line 65 to Column 2, line 6:

Further characteristics and advantages [of the invention] will become better apparent from the description of a preferred, but not exclusive, embodiment of a low-pressure hose for connection to [diving] cylinders for underwater activities, illustrated [by way of] *for guidance and in a* non-limiting [example in] *way with the aid of* the accompanying drawings, wherein:
 FIG. 1 is a schematic layered view of the hose;
 FIG. 2 [is a view of] *shows* the end of a hose connected to a coupling connector.

Column 2, lines 11-16:

With reference to the *aforesaid* figures, the low-pressure hose for connection to [diving] cylinders for underwater activities, according to the invention, generally designated by the reference numeral 1, comprises an inner tubular element 2, which is advantageously made of plastic material, preferably of the polyethylene or polyurethane type.

Column 2, lines 17-19:

An inner [sheathing] *covering* layer 3 is provided on the inner tubular element 2 [by means] *and is made* of a polyester braid which is [formed] *made* directly over the hose.

Column 2, lines 20-27:

The [peculiar] *distinctive* feature of the [hose according to the] invention [resides in] *is* that [there is] an outer [sheathing] *covering* layer 4[, which] is provided [by means of]*, and is*

*made from* a nylon [braiding] *braid* which performs a number of functions, the most important of which is the [provision] *formation* of an abrasion-resistant element, which, however [cooperates], *contributes* to *an* increase *in* the mechanical strength [on] *of* the hose, consequently improving both the bursting pressure and the [traction] *tensile* values.

Column 2, lines 28-35:

It should be noted that the outer [sheathing] *covering* layer 4, constituted by the nylon [braiding] *braid*, is provided directly on the tubular element, [differently from a solution of the background art which applies,] *by contrast with a prior art solution in which an outer covering braid is applied*, in practice like a sheath, [an outer sheathing braid] to the hose, but in such a way that it constitutes an independent element which does not cooperate intimately with the hose except for providing an outer [sheathing] *covering* element.

AS A RESULT OF REEXAMINATION, IT HAS BEEN DETERMINED THAT:

Claims 1-9 are cancelled.

New claims 10-25 are added and determined to be patentable.

10. *A low-pressure hose for connection to a diving cylinder for use in underwater activities, the low pressure hose consisting of:*
   *an inner tubular element having an axial length and consisting of a single layer of a plastic material;*
   *an inner sheathing layer braided directly over the inner tubular element and consisting of a polyester braid;*
   *an outer sheathing layer directly on the inner sheathing layer and consisting of a nylon braid to define an abrasion-resistant outermost element of the low pressure hose that is independent from, not attached to, and does not cooperate intimately with the inner tubular element and inner sheathing layer and thereby provides enhanced flexibility and kinking prevention; and*
   *a hose coupling extending directly over the outer sheathing layer at an end of the hose for connecting to the diving cylinder,*
   *wherein the inner sheathing layer extends along the axial length of the inner tubular element such that the inner tubular element is sheathed and concealed from view by the inner sheathing layer along the axial length.*

11. *The low-pressure hose according to claim 10, wherein said outer sheathing layer is configured to increase bursting resistance and tensile strength of the hose.*

12. *The low-pressure hose according to claim 11, wherein the bursting resistance is at least 250 Bars.*

13. *The low-pressure hose according to claim 10, wherein the nylon braid of the outer sheathing layer is configured to prevent kinking of the low-pressure hose when bent during underwater diving activities.*

14. *The low-pressure hose according to claim 10, wherein said inner tubular element, inner sheathing layer and outer sheathing layer are the only tubular elements of the hose.*

15. *The low-pressure hose according to claim 10, wherein said hose coupling is configured to define a passage in communication with a passage defined by said inner tubular element and connect to the diving cylinder to allow for air flow between the hose and the diving cylinder.*

16. *The low-pressure hose according to claim 10, wherein the outer sheathing layer is braided directly over the inner sheathing layer.*

17. *The low-pressure hose according to claim 10, wherein the plastic material comprises polyurethane.*

18. *The low-pressure hose according to claim 10, wherein the inner sheathing layer is a full braid.*

19. *The low-pressure hose according to claim 10, wherein the outer sheathing layer is a full braid.*

20. *A low-pressure hose for connection to a diving cylinder for use in underwater activities, the low pressure hose consisting of:*
   *an inner tubular element having an axial length and consisting of a single layer of a plastic material;*
   *an inner sheathing layer braided directly over the inner tubular element and consisting of a polyester braid;*
   *an outer sheathing layer directly on the inner sheathing layer and consisting of a nylon braid to define an abrasion-resistant outermost element of the low pressure hose that is independent from, not attached to, and does not cooperate intimately with the inner tubular element and inner sheathing layer and thereby provides enhanced flexibility and kinking prevention; and*
   *a hose coupling extending directly over the outer sheathing layer at an end of the hose for connecting to the diving cylinder,*
   *wherein the outer sheathing layer extends along the axial length of the inner tubular element such that the inner sheathing layer is sheathed and concealed from view by the outer sheathing layer along the axial length.*

21. *The low-pressure hose according to claim 20, wherein the inner sheathing layer is a full braid.*

22. *The low-pressure hose according to claim 20, wherein the outer sheathing layer is a full braid.*

23. *A low-pressure hose for connection to a diving cylinder for use in underwater activities, the low pressure hose consisting of:*
   *an inner tubular element consisting of a single layer of a plastic material;*
   *an inner sheathing layer braided directly over the inner tubular element and consisting of a polyester braid;*
   *an outer sheathing layer directly on the inner sheathing layer and consisting of a nylon braid to define an abrasion-resistant outermost element of the low pressure hose that is independent from, not attached to, and does not cooperate intimately with the inner tubular element and inner sheathing layer and thereby provides enhanced flexibility and kinking prevention; and*
   *a hose coupling extending directly over the outer sheathing layer at an end of the hose for connecting to the diving cylinder,*
   *wherein the inner sheathing layer extends along the axial length of the inner tubular element such that the inner tubular element is sheathed and concealed from view by the inner sheathing layer along the axial length, and*
   *wherein the outer sheathing layer extends along the axial length of the inner tubular element such that the inner sheathing layer is sheathed and concealed from view by the outer sheathing layer along the axial length.*

24. *The low-pressure hose according to claim 23, wherein the inner sheathing layer is a full braid.*

25. *The low-pressure hose according to claim 23, wherein the outer sheathing layer is a full braid.*

\* \* \* \* \*